(12) United States Patent
Aikawa

(10) Patent No.: US 6,412,958 B2
(45) Date of Patent: Jul. 2, 2002

(54) BINOCULARS AND OPTICAL DEVICE PROVIDED WITH VIA-ROTATION-DRAWABLE TYPE EYE CUP

(75) Inventor: Yasuyuki Aikawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 35 days.

(21) Appl. No.: 09/749,566

(22) Filed: Dec. 28, 2000

(30) Foreign Application Priority Data

Jan. 12, 2000 (JP) .................................. 2000-003799

(51) Int. Cl.⁷ ..................... G02B 21/00; G02B 23/16
(52) U.S. Cl. ..................... 359/600; 359/407; 359/611
(58) Field of Search .................. 359/407, 412, 359/418, 425, 506, 507, 511, 611, 612, 700

(56) References Cited

U.S. PATENT DOCUMENTS

| | | | |
|---|---|---|---|
| 4,523,818 A | * 6/1985 | Lang et al. | ........ 359/600 |
| 5,074,652 A | * 12/1991 | Addy | ........ 359/600 |
| 5,784,207 A | 7/1998 | Satoh | |
| 6,280,040 B1 | * 8/2001 | Koide | ........ 359/600 |

* cited by examiner

Primary Examiner—Mark A. Robinson
(74) Attorney, Agent, or Firm—Oliff & Berridge PLC

(57) ABSTRACT

Binoculars includes a pair of lens barrel bodies and a pair of eyepiece portions. At least one of the pair of eyepiece portions is provided with an eyepiece frame fixed on one of the lens barrel bodies, a plurality of eyepiece lenses, a diopter adjusting portion that moves all of the plurality of eyepiece lenses by the same movement amount in an optical axis direction, and a via-rotation-drawable type eye cup portion. The diopter adjusting portion includes a cam pin fixed relative to the eyepiece frame and a diopter ring that is guided by the cam pin in the optical axis direction by rotating of the diopter ring around an optical axis to move all of the plurality of eyepiece lenses in the optical axis direction. The eye cup portion includes a cylindrical eye cup member that is rotatively disposed at an outer side of the diopter ring and is guided by the cam pin in the optical axis direction by rotating of the cylindrical eye cup member around the optical axis to move the eye cup portion in the optical direction.

10 Claims, 5 Drawing Sheets

BINOCULARS AND OPTICAL DEVICE PROVIDED WITH VIA-ROTATION-DRAWABLE TYPE EYE CUP

INCORPORATION BY REFERENCE

The disclosure of the following priority application is herein incorporated by reference:

Japanese Patent Application No. 2000-003799, filed Jan. 12, 2000.

BACKGROUND OF THE INVENTION

1. Field of the Invention

The present invention relates to an optical device, such as binoculars, provided with an eye cup on the eyepiece portion.

2. Description of the Related Art

Conventionally, on the periphery of the eyepiece portion of binoculars is attached a cylindrical eye cup protruding from the eyepiece lenses toward an observer. The eye cup maintains a certain distance between the eyepiece lenses and the observer's eye by the eye cup being applied to the face around the observer's eye. The observer's eye is thus positioned approximately at the pupil position of the optical system in the binoculars, and the observer can obtain a large field of view and stable observation. For an observer wearing glasses, the eye cup contacts to the surface of the glasses, and the distance between the eyepiece lenses and the observer's eye becomes too large to secure proper observation. To remove this drawback, the eye cup is conventionally so constructed that it can be drawn by its rotation or can be turned over.

Additionally, each of the two eyepiece portions of the binoculars has a mechanism for independently moving its eyepiece lenses a certain amount in the optical axis direction for diopter adjustment.

Referring to FIG. 3, an eyepiece portion of binoculars provided with a via-rotation-drawable type eye cup will be specifically described. In the configuration of FIG. 3, eyepiece frame 22 is fixed on lens barrel body 21 of the binoculars. On the inner surface of eyepiece frame 22 is slidably disposed cylindrical eyepiece lens barrel 301. Inside of eyepiece lens barrel 301 are fixed intermediate lens 12 and outer lens 13 that constitute eyepiece lenses. On the outer surface of eyepiece lens barrel 301 is fixed cam pin 23. Linear slot 302 of which major axis is parallel to optical axis 10 is formed in eyepiece frame 22 at the position of cam pin 23. Cam pin 23 is engaged with eyepiece frame 22 by being inserted through linear slot 302. On the other hand, at the outer side of eyepiece frame 22 is disposed diopter ring 20. The inner surface of diopter ring 20 is slidably contacted with the outer surface of eyepiece frame 22. Also, spiral slot 20a spirally formed around optical axis 10 is formed in diopter ring 20, and the head of cam pin 23 is inserted in spiral slot 20a. Cam pin 23 is thus engaged also with diopter ring 20. It is to be noted that diopter ring 20 is fixed relative to eyepiece frame 22 with respect to the direction of optical axis 10 by positioning member 303. Accordingly, diopter ring 20 rotates around optical axis 10 but is fixed with respect to the direction of optical axis 10.

In such a configuration as FIG. 3, because cam pin 23 is engaged with both of spiral slot 20a of diopter ring 20 and linear slot 302 of eyepiece frame 22, cam pin 23 is moved in the direction of optical axis 10 within the range of linear slot 302 by being guided by spiral slot 20a when an observer rotates knurled portion 20b of diopter ring 20 around optical axis 10. Eyepiece lens barrel 301 on which cam pin 23 is fixed thus moves in the direction of optical axis 10, and diopter adjustment can be performed.

Further, in the configuration of the eyepiece portion of FIG. 3, an eye cup is constructed as follows. Specifically, at the outer side of diopter ring 20 is disposed cylindrical eyepiece sleeve 24. Eyepiece sleeve 24 is fixed on eyepiece frame 22. Accordingly, eyepiece sleeve 24 does not rotates even when diopter ring 20 rotates. On the outer side of this fixed eyepiece sleeve 24 is disposed eyepiece cam barrel 25. The inner surface of eyepiece cam barrel 25 is slidably contacted with the outer surface of eyepiece sleeve 24. Into eyepiece sleeve 24 is fixed eye cup drawing cam pin 304 so deep as to reach eyepiece frame 22. Spiral slot 25a spirally formed around optical axis 10 is formed in eyepiece cam barrel 25; the head of cam pin 304 is inserted in spiral slot 25a; and cam pin 304 is engaged with spiral slot 25a. Further the outer surface of eyepiece cam barrel 25 is covered with eyepiece rubber 26 to effect soft contact with the observer.

Thus, when the observer rotates eyepiece cam barrel 25 around optical axis 10, eyepiece cam barrel 25 covered with eyepiece rubber 26 integrally moves in the direction of optical axis 10 by spiral slot 25a being guided by the fixed cam pin 304. In this manner, the eye cup can be drawn and returned to the original position.

Next, referring to FIG. 2, an eyepiece portion of binoculars provided with a turn-over type eye cup will be described. The eyepiece portion of FIG. 2 has a multistage zooming function. Inner lens lever 27 and intermediate lens lever 28 are respectively moved, by a mechanism (not shown), to predetermined positions corresponding to a zoom magnification selected by an observer via a zoom lever (not shown) provided between the right and left lens barrel bodies 21. These predetermined positions are so set that at a higher magnification, the distance between inner lens 11 and intermediate lens 12 becomes larger and that at a lower magnification, the distance becomes shorter. Inner lens lever 27 supports claw 16a of inner lens outer frame 16. Inside of inner lens outer frame 16 is disposed inner lens frame 14 in which inner lens 11 is fixed. On the inner surface of inner lens outer frame 16 is provided a female screw; on the outer surface of inner lens frame 14 is provided a male screw; and both screws are screw-fitted. Thus, by inner lens frame 14 being rotated around optical axis 10, inner lens frame 14 moves, in the direction of optical axis 10, by an amount corresponding to its angle of rotation. Further, intermediate lens lever 28 supports claw 17a of intermediate lens outer frame 17. On the inner surface of intermediate lens outer frame 17 is screw-fitted intermediate lens frame 15 to which intermediate lens 12 is fixed. Thus, by intermediate lens frame 15 being rotated around optical axis 10, intermediate lens frame 15 moves, in the direction of optical axis 10, by an amount corresponding to its angle of rotation.

On the other hand, in the configuration of FIG. 2, eyepiece frame 22 is fixed on lens barrel body 21. On the inner surface of eyepiece frame 22 is screw-fitted outer lens frame 19 in which outer lens 13 is fixed. Thus, by outer lens frame 19 being rotated around optical axis 10, outer lens frame 19 moves, in the direction of optical axis 10, by an amount corresponding to its angle of rotation. Outer lens frame 19 is fixed, by screw 201, on diopter ring 20 rotatively disposed at the outer side of eyepiece frame 22. Thus, by diopter ring 20 being rotated, outer lens frame 19 rotates and moves, in the direction of optical axis 10, by an amount corresponding to its angle of rotation.

Furthermore, outer lens frame 19 has protruding portion 19a elongated in the direction of optical axis 10, and this protruding portion 19a is inserted into through hole 15b formed through intermediate lens frame 15. Consequently, rotation of intermediate lens frame 15 accompanies the rotation of outer lens frame 19. Also, intermediate lens frame 15 is provided with protruding portion 15a elongated in the direction of optical axis 10, and protruding portion 15a is inserted into through hole 14b formed through inner lens frame 14. Thus, rotation of inner lens frame 14 accompanies the simultaneous rotation of outer lens frame 19 and intermediate lens frame 15. Intermediate lens frame 15 and inner lens frame 14 move, via the rotation, by the same movement amount in the direction of optical axis 10 as that of outer lens frame 19 caused by its rotation. Accordingly, because, via the rotation of diopter ring 20, all of outer lens frame 19, intermediate lens frame 15, and inner lens frame 14 move in the same direction and by the same movement amount along optical axis 10, diopter adjustment can be performed. It is to be noted that because intermediate lens frame 15 and inner lens frame 14 move within the length of protruding portion 19a and protruding portion 15a, respectively, even when the zoom lever is operated, the engagement between intermediate lens frame 15 and protruding portion 19a and that engagement between inner lens frame 14 and protruding portion 15a are maintained even when zoom magnification is changed.

In the configuration of FIG. 2, the eye cup is constituted of eyepiece rubber 26 that covers diopter ring 20. During diopter adjustment, eyepiece rubber 26 integrally rotates with diopter ring 20. For an observer wearing glasses to observe, eye cup portion 26a of eyepiece rubber 26 is turned over to the side of diopter ring 20.

As described above, with respect to the eye cup, there have been a via-rotation-drawable type and a turn-over type constituted only of eyepiece rubber. The turn-over type eye cup, however, deteriorates, due to longtime use, in its repeatedly turned over portion of rubber, and cracks may occur in the portion. Besides, the via-rotation-drawable type eye cup is, in recent years, generally preferred from the viewpoint of design. However, although in the case of the eyepiece portion of a fixed magnification optical system without a zooming function as illustrated in FIG. 3, the via-rotation-drawable type eye cup has been realized in the past, such type eye cup has not yet been realized in the case of the eyepiece portion with a zooming function as illustrated in FIG. 2. This is because the eyepiece portion provided with a zooming function is complicated in structure, i.e., diopter ring 20 is disposed so as to extend to the eyepiece side end surface of outer lens frame 19, and the via-rotation-drawable eye cup configuration including eyepiece sleeve 24, cam pin 304, and eyepiece cam barrel 25 as illustrated in FIG. 3 could not be applied as it is. Also, any attempt, through some ingenuities, to attach a via-rotation-drawable eye cup to the configuration of FIG. 2 would result in a larger diameter than that of the eye cup from eyepiece rubber 26 by the amount required by the conceived via-rotation-drawable mechanism, and it is difficult to realize a compact via-rotation-drawable eye cup.

SUMMARY OF THE INVENTION

It is an object of the present invention to provide binoculars, while being provided with a zooming function in the eyepiece portion, having a compact via-rotation-drawable type eye cup.

In order to attain the above object, binoculars according to the present invention comprises: a pair of lens barrel bodies; a pair of eyepiece portions; at least one of the pair of eyepiece portions being provided with an eyepiece frame fixed on one of the lens barrel bodies, a plurality of eyepiece lenses, a diopter adjusting portion that moves all of the plurality of eyepiece lenses by the same movement amount in an optical axis direction, and a via-rotation-drawable type eye cup portion; the diopter adjusting portion including a cam pin fixed relative to the eyepiece frame and a diopter ring that is guided by the cam pin in the optical axis direction by rotating of the diopter ring around an optical axis to move all of the plurality of eyepiece lenses in the optical axis direction; and the eye cup portion including a cylindrical eye cup member that is rotatively disposed at an outer side of the diopter ring and is guided by the cam pin in the optical axis direction by rotating of the cylindrical eye cup member around the optical axis to move the eye cup portion in the optical direction.

In this binoculars, it is preferred that the at least one of the pair of right and left eyepiece portions is further provided with a zooming portion that moves at least one of the plurality of eyepiece lenses in the optical axis direction for zooming.

Also, it is preferred that a second cylindrical member is fixedly disposed, between the diopter ring and the cylindrical eye cup member, relative to the eyepiece frame, the diopter ring rotates while sliding along the inner surface of the second cylindrical member, and the cylindrical eye cup member rotates while sliding along the outer surface of the second cylindrical member.

Also, it is preferred that the diopter ring has a spiral slot that engages with the cam pin to be guided in the optical axis direction, and the cylindrical eye cup member has a spiral slot that engages with the cam pin to be guided in the optical axis direction.

Also, it is preferred that the eye cup portion includes an elastic member that covers the cylindrical eye cup member.

An optical device according to the present invention comprises: a pair of lens barrel bodies; a pair of eyepiece portions; at least one of the pair of eyepiece portions being provided with an eyepiece frame fixed on one of the lens barrel bodies, a plurality of eyepiece lenses, a diopter adjusting portion that moves all of the plurality of eyepiece lenses by the same movement amount in an optical axis direction, and a via-rotation-drawable type eye cup portion; the diopter adjusting portion including a cam pin fixed relative to the eyepiece frame and a diopter ring that is guided by the cam pin in the optical axis direction by rotating of the diopter ring around an optical axis to move all of the plurality of eyepiece lenses in the optical axis direction; and the eye cup portion including a cylindrical eye cup member that is rotatively disposed at an outer side of the diopter ring and is guided by the cam pin in the optical axis direction by rotating of the cylindrical eye cup member around the optical axis to move the eye cup portion in the optical direction.

In this optical device, it is preferred that the at least one of the pair of right and left eyepiece portions is further provided with a zooming portion that moves at least one of the plurality of eyepiece lenses in the optical axis direction for zooming.

Also, it is preferred that a second cylindrical member is fixedly disposed, between the diopter ring and the cylindrical eye cup member, relative to the eyepiece frame, the diopter ring rotates while sliding along the inner surface of the second cylindrical member, and the cylindrical eye cup member rotates while sliding along the outer surface of the second cylindrical member.

Also, it is preferred that the diopter ring has a spiral slot that engages with the cam pin to be guided in the optical axis direction, and the cylindrical eye cup member has a spiral slot that engages with the cam pin to be guided in the optical axis direction.

Also, it is preferred that the eye cup portion includes an elastic member that covers the cylindrical eye cup member.

DESCRIPTION OF THE PREFERRED EMBODIMENT

Figure 1:
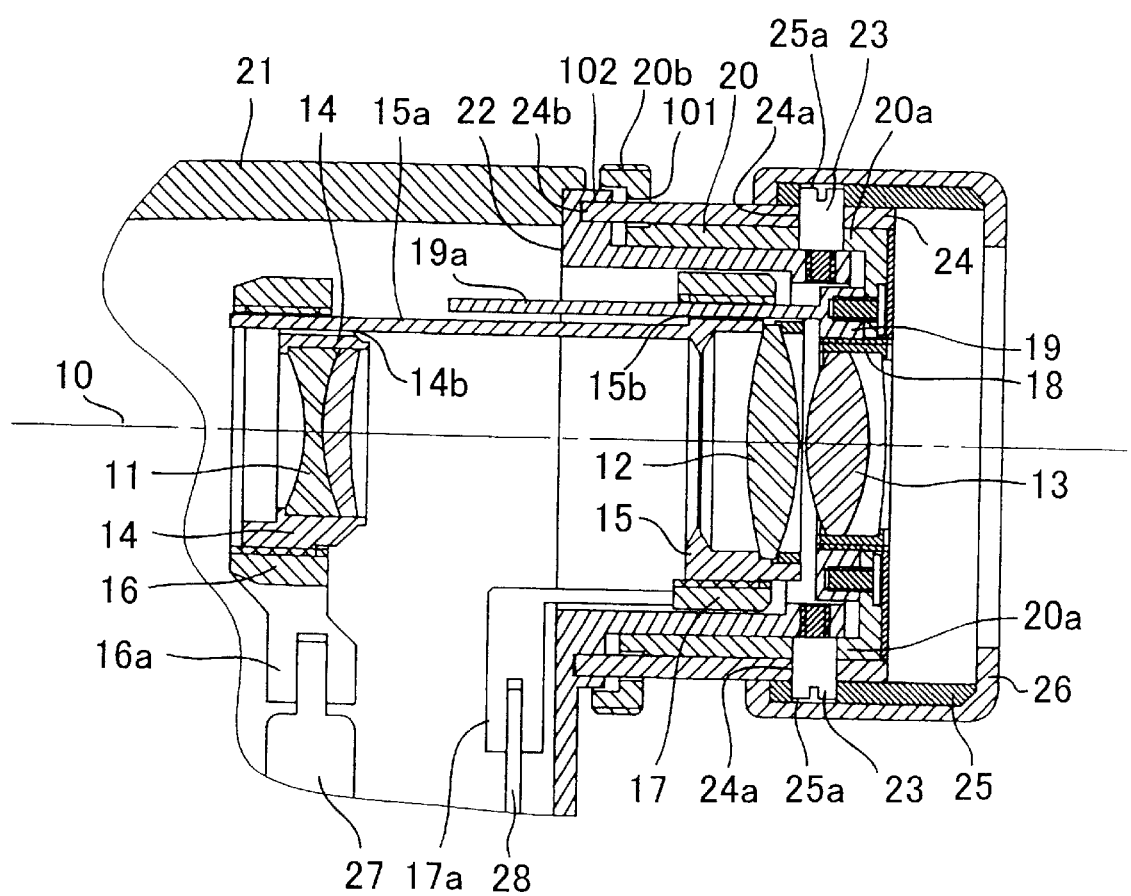
FIG. 1 is a cross sectional view illustrating a configuration of an eyepiece portion of binoculars according to an embodiment of the present invention.

Referring to the drawings, an embodiment of the present invention will be described.

Figure 4:
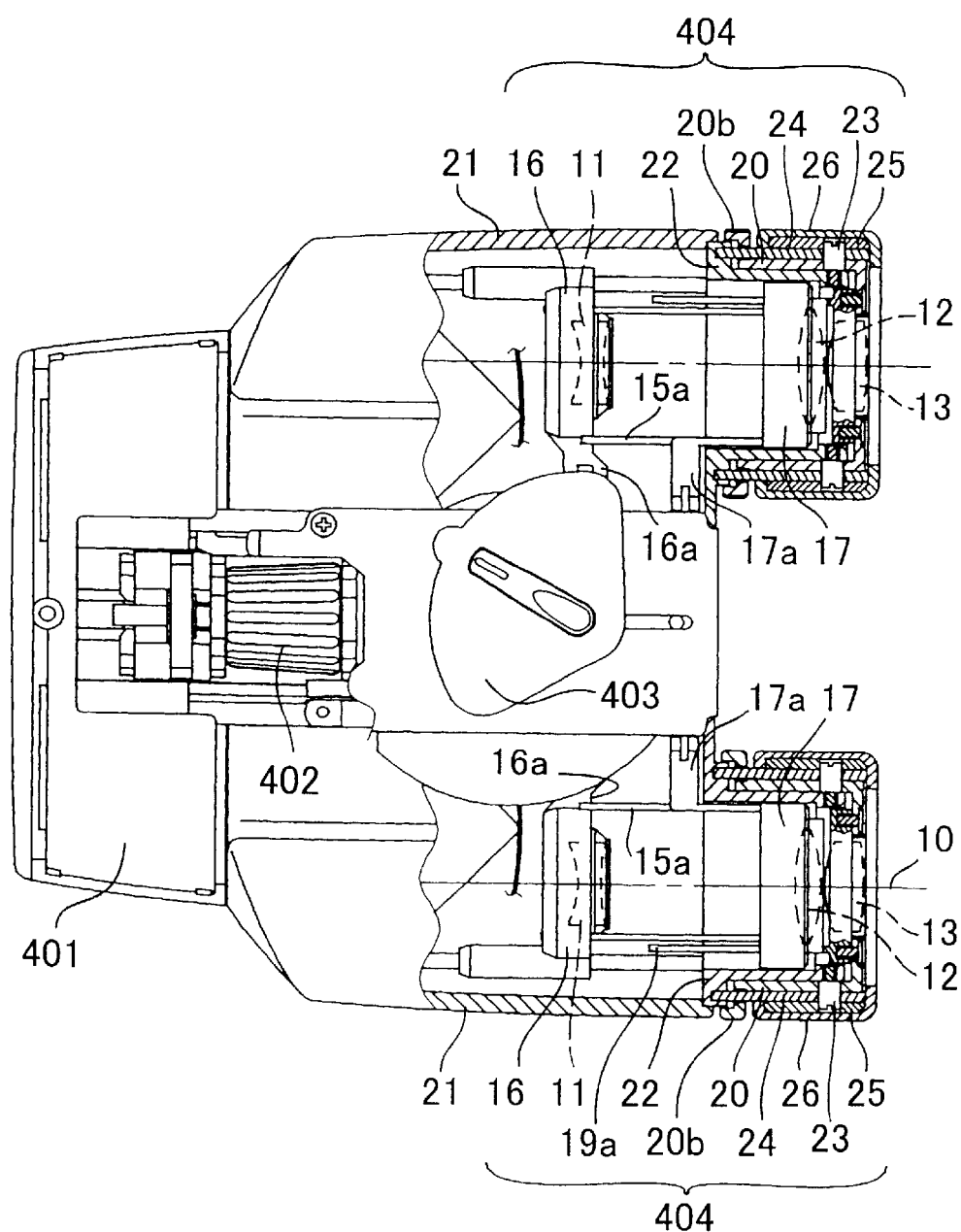
FIG. 4 is a partly broken-away cross sectional view illustrating an overall configuration of binoculars according to an embodiment of the present invention.

The overall configuration of the binoculars of the embodiment of the present invention will be described referring to FIG. 4, and the details of the eyepiece portion will be described referring to FIG. 1. The binoculars of the embodiment have objective portion 401 in which a pair of right and left objective lenses are disposed, a pair of right and left lens barrel bodies 21 in each of which a prism, etc. are disposed, and a pair of eyepiece portions 404 provided with a zooming function. As described later, each of eyepiece portions 404 is provided with a via-rotation-drawable type eye cup. Further, between the pair of right and left lens barrel bodies 21 are disposed focusing knob (or focusing ring) 402 for focus adjustment and zoom lever 403 for an observer to select a desired zoom magnification among a plurality of zoom magnifications.

Eyepiece portion 404 has, as eyepiece lenses, inner lens 11, intermediate lens 12, and outer lens 13 that are successively disposed on optical axis 10 as viewed from objective portion 401. Eyepiece portion 404 includes inner lens lever 27 and intermediate lens lever 28 for moving inner lens 11 and intermediate lens 12, respectively, to predetermined positions corresponding to zoom magnifications set at zoom lever 403. Inner lens lever 27 supports claw 16a of inner lens outer frame 16. Inside of inner lens outer frame 16 is disposed inner lens frame 14 in which inner lens 11 is fixed. Further, intermediate lens lever 28 supports claw 17a of intermediate lens outer frame 17. Inside of intermediate lens outer frame 17 is disposed intermediate lens frame 15 in which intermediate lens 12 is fixed. A mechanism, not shown, provided in lens barrel bodies 21 moves inner lens lever 27 and intermediate lens lever 28 to predetermined positions corresponding to zoom magnifications set at zoom lever 403. Thus, inner lens 11 and intermediate lens 12 respectively move to positions corresponding to zoom magnifications set at zoom lever 403. The positions corresponding to zoom magnifications are predetermined positions that are so set that at a higher magnification, the distance between inner lens 11 and intermediate lens 12 becomes larger and that at a lower magnification, the distance becomes shorter for a desired zoom magnification to be obtained.

Also, on the inner surface of inner lens outer frame 16 is provided a female screw; on the outer surface of inner lens frame 14 is provided a male screw; and thus inner lens outer frame 16 and inner lens frame 14 are screw-fitted. Accordingly, it is so configured that when inner lens frame 14 rotates around optical axis 10, inner lens frame 14 moves, in the direction of optical axis 10, by an amount corresponding to its angle of rotation. Similarly, intermediate lens outer frame 17 and intermediate lens frame 15 are screw-fitted. Thus, it is so configured that when intermediate lens frame 15 rotates around optical axis 10, intermediate lens frame 15 moves, in the direction of optical axis 10, by an amount corresponding to its angle of rotation. The pitches of the screws are so determined that the directions and the movement amounts of both of inner lens frame 14 and intermediate lens frame 15 corresponding to their angles of rotation become the same. Thus, when inner lens frame 14 and intermediate lens frame 15 are rotated by the same angle of rotation, both of them move in the same direction and by the same movement amount along optical axis 10. As described later, utilizing the movement, diopter adjustment is performed.

Figure 5:
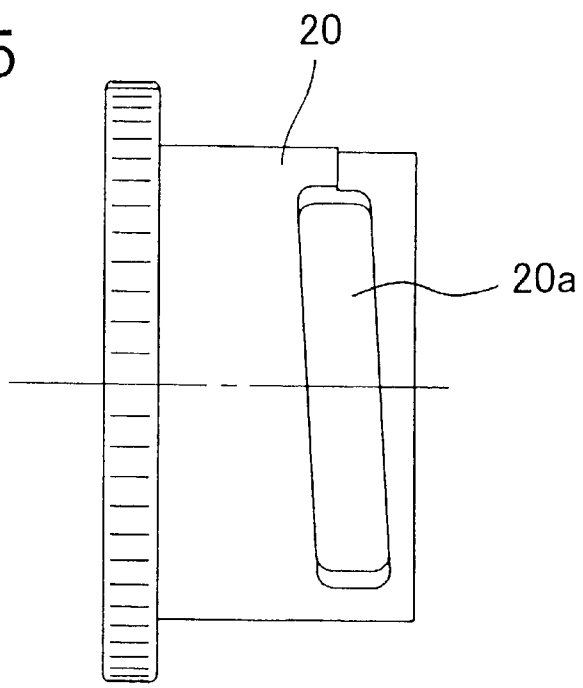
FIG. 5 shows spiral slot 20a formed in diopter ring 20 viewed from upper side in FIG. 1.

On the other hand, on the eyepiece side end portion of lens barrel body 21 is fixed eyepiece frame 22. On the outer surface of eyepiece frame 22 are fixed two cam pins 23 being separated by an angle of 180 degrees. On the outer side of eyepiece frame 22 is slidably disposed diopter ring 20. Spiral slot 20a spirally formed around optical axis 10 is formed in diopter ring 20, and by the head of cam pin 23 being inserted through spiral slot 20a, cam pin 23 and diopter ring 20 are engaged. FIG. 5 shows spiral slot 20a formed in diopter ring 20 viewed from upper side in FIG. 1. Diopter ring 20 is screw-fixed to outer lens frame 19 disposed inside of eyepiece frame 22. To outer lens frame 19 is fixed outer lens 13 held by outer lens inner barrel 18. Thus, when an observer rotates knurled portion 20b of diopter ring 20 around optical axis 10, spiral slot 20a of diopter ring 20 being guided by cam pin 23 fixed relative to eyepiece frame 22, diopter ring 20 moves, in the direction of optical axis 10, by an amount corresponding to its rotation while rotating. Following this, outer lens frame 19 fixed to diopter ring 20 also moves in the direction of optical axis 10 while rotating. The pitch of spiral slot 20a of diopter ring 20 is determined so that the movement amount of outer lens frame 19 in the direction of optical axis 10 corresponding to its angle of rotation becomes the same as the above-described movement amount of inner lens frame 14 and intermediate lens frame 15 corresponding to their angle of rotation.

On outer lens frame 19 is formed protruding portion 19a elongated in the direction of optical axis 10 for rotating intermediate lens frame 15 in synchronization with the rotation of outer lens frame 19. This protruding portion 19a is inserted into through hole 15b formed through intermediate lens frame 15. Consequently, when outer lens frame 19 rotates, intermediate lens frame 15, being drawn by protruding portion 19a, also synchronously rotates. Also, on intermediate lens frame 15 is provided with protruding portion 15a elongated in the direction of optical axis 10 for rotating inner lens frame 14 in synchronization with the rotation of intermediate lens frame 15. Protruding portion 15a is inserted into through hole 14b formed through inner lens frame 14. Thus, when diopter ring 20 moves in the direction of optical axis 10 while rotating, outer lens frame 19, intermediate lens frame 15, and inner lens frame 14 move in the direction of optical axis 10 by the same movement amount while rotating by the same angle of rotation. By this, via the rotation of diopter ring 20, diopter adjustment can be performed.

It is to be noted that the sizes of protruding portions 19a and 15a and the aperture sizes of through holes 15b and 14b are so determined that the movements of intermediate lens frame 15 and inner lens frame 14 in the direction of optical axis 10 via the operation of zoom lever 403 are not prevented and that play does not occur during the rotation for diopter adjustment. Also, the lengths of protruding portions 19a and 15a are set to be equal to or longer than the movement amounts of intermediate lens frame 15 and inner lens frame 14 via the operation of zoom lever 403. Accordingly, the movements of intermediate lens frame 15 and inner lens frame 14 in the direction of optical axis 10 via the operation of zoom lever 403 are not prevented by protruding portions 19a and 15a, and the movement amount is within the lengths of protruding portion 19a and protruding portion 15a. Thus, diopter adjustment can be performed at any zoom magnification.

Next, the configuration of a via-rotation-drawable type eye cup will be described. The eye cup portion includes cylindrical eyepiece sleeve 24 disposed at the outer side of diopter ring 20, eyepiece cam barrel 25 disposed at the still outer side of eyepiece sleeve 24, and eyepiece rubber 26 covering the outer side of eyepiece cam barrel 25. In eyepiece sleeve 24, at the positions of cam pins 23, are formed through holes 24a of circular aperture form, and cam pins 23 are inserted through these through holes 24a. Further, eyepiece sleeve 24 has protruding portions 24b at the side of lens barrel body 21, and these protruding portions 24b are disposed through apertures 101 formed in knurled portion 20b of diopter ring 20 and are fitted into hollow portions 102 of eyepiece frame 22. The circumferential length of aperture 101 is set to be equal to or longer than that of spiral slot 20a. Accordingly, eyepiece sleeve 24 does not rotates even when diopter ring 20 rotates, and moreover, eyepiece sleeve 24 does not prevent the rotation of diopter ring 20. It is to be noted that protruding portions 24b and through holes 24a define the position of eyepiece sleeve 24 relative to eyepiece frame 22.

Figure 6:
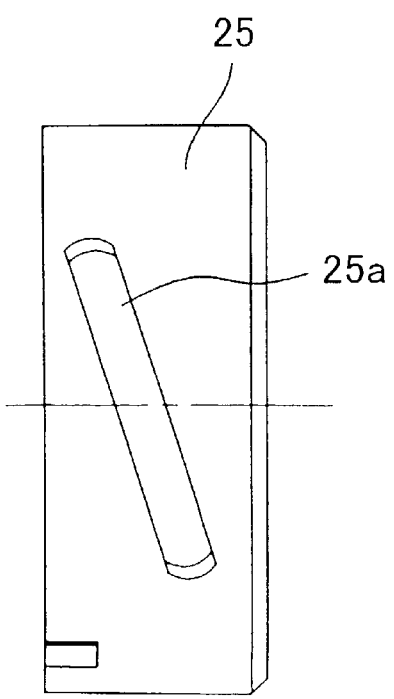
FIG. 6 shows spiral slot 25a formed in eye piece cam barrel 25 viewed from upper side in FIG. 1.

Eyepiece cam barrel 25 has a spiral slot 25a spirally formed around optical axis 10. FIG. 6 shows spiral slot 25a formed in eye piece cam barrel 25 viewed from upper side in FIG. 1. Into this spiral slot 25a is inserted the head of cam pin 23. By this, when an observer rotates cam barrel 25, spiral slot 25a rotates while being guided by cam pin 23. Accordingly, cam barrel 25 moves, in the direction of optical axis 10, by an amount corresponding to the angle of rotation. Thus, eyepiece cam barrel 25 covered with eyepiece rubber 26 can be drawn forth and back, and the via-rotation-drawable type eye cup can be realized.

Additionally, to provide, e.g., a click-mechanism, on a portion of the outer surface of eyepiece sleeve 24 is provided a resilient protruding portion (not shown), and on the inner surface of eyepiece cam barrel 25 are provided two hollow portions. The resilient protruding portion and the two hollow portions are arranged in a positional relationship such that the resilient protruding portion fits into one of the two hollow portions when eyepiece cam barrel 25 is drawn forth to the outermost position and when drawn back to the innermost position, respectively. By this, the eye cup is so-called-click-stopped at the positions where the eye cup is drawn forth to the outermost position and when drawn back to the innermost position. Thus, the eye cup cannot be easily moved from the states where it is drawn forth to the outermost position and where drawn back to the innermost position because to perform the drawing forth and back operation of the eye cup, it is necessary to rotate eyepiece sleeve 24 applying force to overcome the resilient force of the protruding portion. The eye cup can be thus held in stabilized positions during observation.

Next, the operations of various portions of the binoculars according to the embodiment of the invention, when used by an observer, will be described. For an observer not wearing glasses, by drawing forth eyepiece cam barrel 25 covered with eyepiece rubber 26 via its rotation, the binoculars can be used in the state where the eye cup is drawn forth as shown FIG. 1. While the observer looking into the eyepiece lenses applying the eye cup, by rotating knurled portion 20b of diopter ring 20 as necessary, the eyepiece lenses are moved in the direction of optical axis 10, and diopter adjustment can be performed. During this diopter adjustment operation, because the rotative operation of diopter ring 20 is independent of the rotative operation of eyepiece cam barrel 25, the position of the eye cup does not change. When the observer operates zoom lever 403 to change the zoom magnification, inner lens 11 and intermediate lens 12 of the eyepiece lenses move. Even during the zoom magnification change operation, the position of the eye cup does not change, and diopter adjustment can be performed by diopter ring 20. Further, for an observer wearing glasses, by rotating eyepiece cam barrel 25, eyepiece cam barrel 25 covered with eyepiece rubber 26 can be easily drawn back.

As has been described above, in the binoculars according to the embodiment of the invention, it is so configured that the movement of outer lens frame 19 in the direction of optical axis 10 for the diopter adjustment of eyepiece portion 404 is realized by spiral slot 20a being guided by cam pin 23 and that this cam pin 23 is also utilized to guide spiral slot 25a for the drawing operation of eyepiece cam barrel 25 of the eye cup. Through this configuration, a via-rotation-drawable eye cup can be incorporated in eyepiece portion 404 provided with a zooming function. Furthermore, in this configuration, because the diameter of the via-rotation-drawable eye cup is approximately equal to that of knurled portion 20b of diopter ring 20, a compact eye cup, while being via-rotation-drawable, can be realized as is the case with a turn-over type eye cup.

Further, in the embodiment of the invention, between diopter ring 20 and eyepiece cam barrel 25 is disposed eyepiece sleeve 24 so configured that eyepiece sleeve 24 itself does not rotate and, at the same time, it does not prevent the rotations of diopter ring 20 and eyepiece cam barrel 25. By this, diopter ring 20 and eyepiece cam barrel 25 can independently rotate without being affected by each other's rotative operation. Thus, in eyepiece portion 404 of the embodiment of the invention, the diopter adjustment and the drawing operation of the eye cup can be independently performed.

Also, there is an effect that in the case of the via-rotation-drawable type eye cup, because eyepiece rubber 26 need not to be turned over, eyepiece rubber 26 less deteriorates compared with the eyepiece rubber of a turn-over type eye cup.

Figure 2:
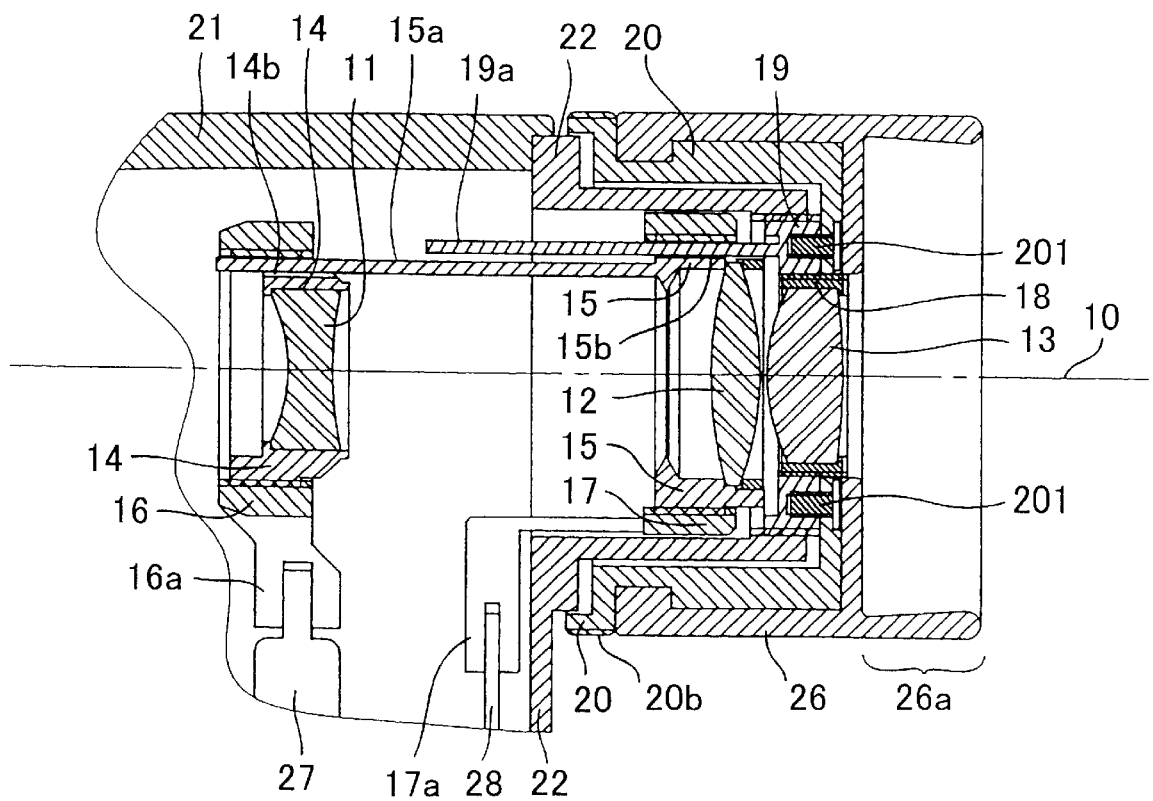
FIG. 2 is a cross sectional view illustrating a configuration of an eyepiece portion, provided with a zooming function, of conventional binoculars.
Figure 3:
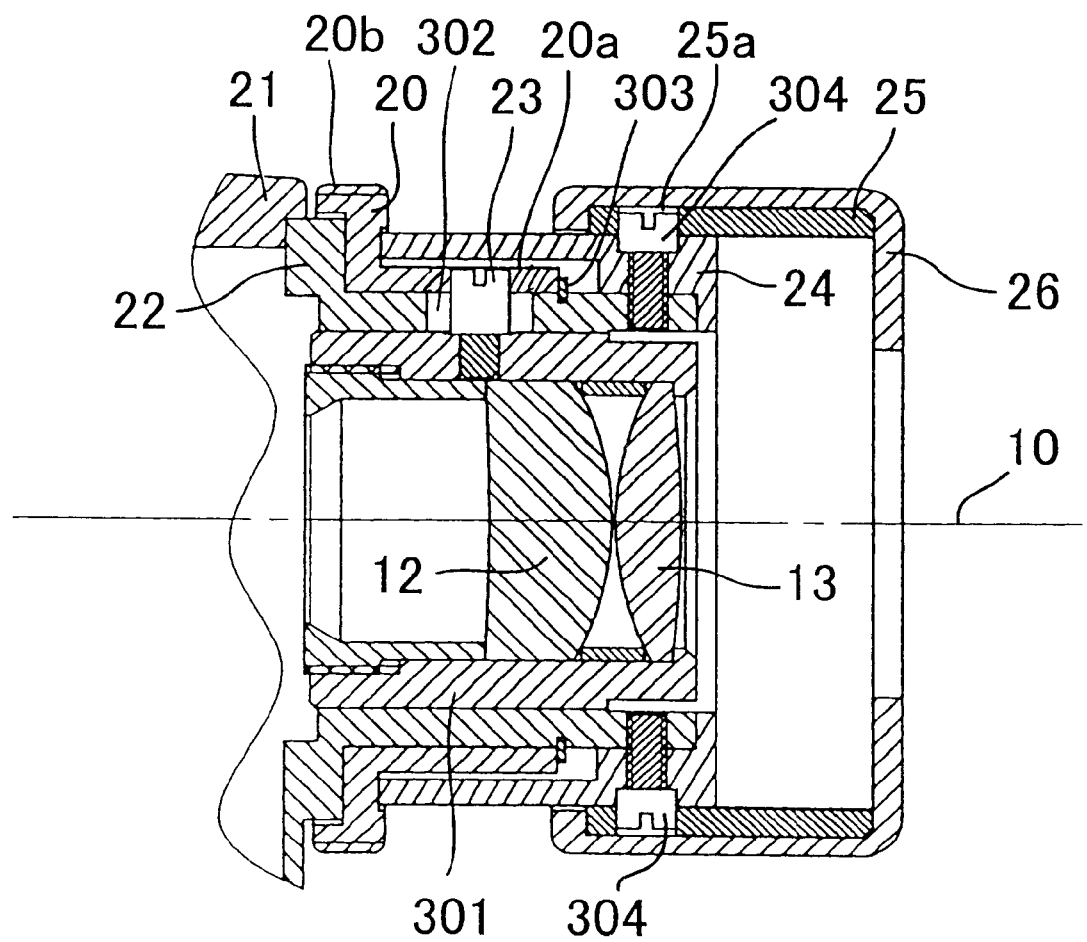
FIG. 3 is cross sectional view illustrating a configuration of an eyepiece portion, provided with a fixed magnification optical system, of conventional binoculars.

It is to be noted that although, in the above-described embodiment, it is so configured that in diopter ring 20 is provided spiral slot 20a, and by spiral slot 20a being guided by cam pin 23, outer lens frame 19 moves in the direction of optical axis 10 while rotating, it can alternatively be so configured that diopter ring 20 does not move in the direction of optical axis 10. For example, it may be so configured that in place of spiral slot 20a, a slot is circumferentially formed in diopter ring 20, and diopter ring 20 simply rotates around optical axis 10 and does not move in the direction of optical axis 10. Further, outer lens frame 19 and eyepiece frame 22 are mutually screw-fitted as illustrated in FIG. 2 of conventional art; a protruding portion like protruding portion 19a is provided on diopter ring 20; and, the protruding portion, being engaged with outer lens frame 19, is rotated following the rotation of diopter ring 20. Thus, it can be so configured that, without the use of spiral slot 20a, outer lens frame 19 moves in the direction of optical axis 10 following the rotation of diopter ring 20.

Although, in the above-described embodiment, it is explained as an example that each of mechanisms for diopter adjustment is independently provided on each of the two eyepiece portions, one mechanism for diopter adjustment may be provided on either one of the two eyepiece portions. Although, in the above-described embodiment, the configuration in which a via-rotation-drawable type eye cup is realized in an eyepiece portion of binoculars provided with a zooming function, also with respect to an optical device, such as a stereomicroscope, provided with a zooming function, by making the configuration of its eyepiece portion as illustrated in FIG. 1, a via-rotation-drawable type eye cup can be realized.

What is claimed is:

1. Binoculars comprising:

a pair of lens barrel bodies;

a pair of eyepiece portions;

at least one of said pair of eyepiece portions being provided with an eyepiece frame fixed on one of said lens barrel bodies, a plurality of eyepiece lenses, a diopter adjusting portion that moves all of said plurality of eyepiece lenses by the same movement amount in an optical axis direction, and a via-rotation-drawable type eye cup portion;

said diopter adjusting portion including a cam pin fixed relative to said eyepiece frame and a diopter ring that is guided by said cam pin in the optical axis direction by rotating of the diopter ring around an optical axis to move all of said plurality of eyepiece lenses in the optical axis direction; and said eye cup portion including a cylindrical eye cup member that is rotatively disposed at an outer side of said diopter ring and is guided by said cam pin in the optical axis direction by rotating of the cylindrical eye cup member around the optical axis to move said eye cup portion in the optical direction.

2. Binoculars according to claim 1, wherein said at least one of said pair of right and left eyepiece portions is further provided with a zooming portion that moves at least one of said plurality of eyepiece lenses in the optical axis direction for zooming.

3. Binoculars according to claim 1, wherein a second cylindrical member is fixedly disposed, between said diopter ring and said cylindrical eye cup member, relative to said eyepiece frame, said diopter ring rotates while sliding along the inner surface of said second cylindrical member, and said cylindrical eye cup member rotates while sliding along the outer surface of said second cylindrical member.

4. Binoculars according to claim 1, wherein said diopter ring has a spiral slot that engages with said cam pin to be guided in the optical axis direction, and said cylindrical eye cup member has a spiral slot that engages with said cam pin to be guided in the optical axis direction.

5. Binoculars according to claim 1, wherein said eye cup portion includes an elastic member that covers said cylindrical eye cup member.

6. An optical device comprising:

a pair of lens barrel bodies;

a pair of eyepiece portions;

at least one of said pair of eyepiece portions being provided with an eyepiece frame fixed on one of said lens barrel bodies, a plurality of eyepiece lenses, a diopter adjusting portion that moves all of said plurality of eyepiece lenses by the same movement amount in an optical axis direction, and a via-rotation-drawable type eye cup portion;

said diopter adjusting portion including a cam pin fixed relative to said eyepiece frame and a diopter ring that is guided by said cam pin in the optical axis direction by rotating of the diopter ring around an optical axis to move all of said plurality of eyepiece lenses in the optical axis direction; and said eye cup portion including a cylindrical eye cup member that is rotatively disposed at an outer side of said diopter ring and is guided by said cam pin in the optical axis direction by rotating of the cylindrical eye cup member around the optical axis to move said eye cup portion in the optical direction.

7. An optical device according to claim 6, wherein said at least one of said pair of right and left eyepiece portions is further provided with a zooming portion that moves at least one of said plurality of eyepiece lenses in the optical axis direction for zooming.

8. An optical device according to claim 6, wherein a second cylindrical member is fixedly disposed, between said diopter ring and said cylindrical eye cup member, relative to said eyepiece frame, said diopter ring rotates while sliding along the inner surface of said second cylindrical member, and said cylindrical eye cup member rotates while sliding along the outer surface of said second cylindrical member.

9. An optical device according to claim 6, wherein said diopter ring has a spiral slot that engages with said cam pin to be guided in the optical axis direction, and said cylindrical eye cup member has a spiral slot that engages with said cam pin to be guided in the optical axis direction.

10. An optical device according to claim 6, wherein said eye cup portion includes an elastic member that covers said cylindrical eye cup member.

* * * * *